US 12,380,028 B2

United States Patent
Li et al.

(10) Patent No.: US 12,380,028 B2
(45) Date of Patent: Aug. 5, 2025

(54) DATA PROCESSING METHOD AND APPARATUS AND HETEROGENEOUS SYSTEM

(71) Applicant: HUAWEI TECHNOLOGIES CO., LTD., Guangdong (CN)

(72) Inventors: Tao Li, Hangzhou (CN); Weibin Lin, Hangzhou (CN); Haocheng Liu, Hangzhou (CN); Lixia Xu, Hangzhou (CN); Sheng Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 292 days.

(21) Appl. No.: 18/046,151

(22) Filed: Oct. 12, 2022

(65) Prior Publication Data

US 2023/0114242 A1 Apr. 13, 2023

Related U.S. Application Data

(63) Continuation of application No. PCT/CN2021/086703, filed on Apr. 12, 2021.

(30) Foreign Application Priority Data

Apr. 22, 2020 (CN) .......................... 202010323587.5

(51) Int. Cl.
 *G06F 9/38* (2018.01)
 *G06F 12/0815* (2016.01)

(52) U.S. Cl.
 CPC ........ *G06F 12/0815* (2013.01); *G06F 9/3877* (2013.01); *G06F 2212/1016* (2013.01); *G06F 2212/621* (2013.01)

(58) Field of Classification Search
 CPC .......................... G06F 9/3877; G06F 12/0815
 See application file for complete search history.

(56) References Cited

U.S. PATENT DOCUMENTS

| | | | | |
|---|---|---|---|---|
| 5,021,991 A | * | 6/1991 | MacGregor | ........... G06F 9/3861 |
| | | | | 710/305 |
| 8,447,957 B1 | * | 5/2013 | Carrillo | ............... G06F 13/1684 |
| | | | | 712/225 |

(Continued)

FOREIGN PATENT DOCUMENTS

| | | |
|---|---|---|
| CN | 104794100 A | 7/2015 |
| CN | 106502782 A | 3/2017 |

(Continued)

OTHER PUBLICATIONS

Li Yan et al: "Accelerating 3D Digital Differential Analyzer Ray Tracing Algorithm on the GPU Using CUDA", International Conference on Parallel Processing Workshop. Proceedings, IEEE, US, Sep. 1, 2015 (Sep. 1, 2015), pp. 61-66, XP032828247, total 6 pages.

(Continued)

*Primary Examiner* — Jacob Petranek

(57) ABSTRACT

A data processing method and apparatus, and a heterogeneous system, pertaining to the field of computer technologies are provided. The heterogeneous system includes a processor connected to an accelerator. A secondary memory is connected to the accelerator. The processor is configured to write to-be-processed data into the secondary memory and trigger the accelerator to access and process the to-be-processed data stored in the secondary memory according to a processing instruction. The accelerator is configured to write a processing result of the to-be-processed data into the secondary memory and to trigger the processor to read the processing result. Processing efficiency is enhanced by reducing the number of times of interaction between the processor and the accelerator and simplifying the procedure for data processing.

11 Claims, 8 Drawing Sheets

(56) References Cited

U.S. PATENT DOCUMENTS

| | | | |
|---|---|---|---|
| 9,648,102 B1 | 5/2017 | Davis et al. | |
| 2002/0013872 A1* | 1/2002 | Yamada | G06F 9/3881 710/240 |
| 2007/0198984 A1* | 8/2007 | Favor | G06F 9/3838 718/104 |
| 2012/0204005 A1* | 8/2012 | Dockser | G06F 9/3877 712/205 |
| 2012/0284446 A1 | 11/2012 | Biran et al. | |
| 2015/0269074 A1* | 9/2015 | Shah | G06F 13/28 711/130 |
| 2018/0081804 A1 | 3/2018 | Turner et al. | |
| 2020/0226081 A1* | 7/2020 | Kalyanasundharam | G06F 9/3877 |

FOREIGN PATENT DOCUMENTS

| | | |
|---|---|---|
| CN | 107122243 A | 9/2017 |
| CN | 109308280 A | 2/2019 |
| CN | 110069439 A | 7/2019 |
| CN | 111026363 A | 4/2020 |
| CN | 111198839 A | 5/2020 |
| EP | 3992804 A1 | 5/2022 |
| WO | 2019095154 A1 | 5/2019 |

OTHER PUBLICATIONS

Anonymous: "CUDA C++ Programming Guide Design Guide", Nov. 1, 2019 (Nov. 1, 2019), pp. 1-346, XP055842245.

He Dazhong et al: "A Survey to Predict the Trend of AI-able Server Evolution in the Cloud", IEEE Access, vol. 6, Mar. 14, 2018, pp. 10591-10602, XP011679050.

Heiner Giefers and Dionysios Diamantopoulos, Extending the Power Architecture with Transprecision Co-Processors IBM Research Zurich, May 27-30, 2018, total 5 pages.

CUDA C Programming Guide, p. 02829-001_v7.5, Sep. 2015 Design Guide, total 261 pages.

* cited by examiner

DATA PROCESSING METHOD AND APPARATUS AND HETEROGENEOUS SYSTEM

CROSS-REFERENCE TO RELATED APPLICATIONS

This application is a continuation of International Application No. PCT/CN2021/086703, filed on Apr. 12, 2021, which claims priority to Chinese Patent Application No. 202010323587.5 filed on Apr. 22, 2020. The disclosures of the aforementioned applications are hereby incorporated by reference in their entireties.

TECHNICAL FIELD

This disclosure relates to the field of computer technologies, and in particular, to a data processing method and apparatus, and a heterogeneous system.

BACKGROUND

A heterogeneous system usually includes a processor and an accelerator that are connected by a high-speed serial computer expansion bus standard (PCIE) bus. The accelerator can assist the processor in performing a specific data processing procedure so that the heterogeneous system has a strong data processing capability.

Generally, the processor is connected to a primary memory and the accelerator is connected to a secondary memory. When the processor needs to control the accelerator to process data, the processor first needs to notify the accelerator to migrate the to-be-processed data in the primary memory to the secondary memory through direct memory access (DMA). Then the processor further needs to notify the accelerator to process the data in the secondary memory. After processing the data, the accelerator writes a processing result into the secondary memory, and notifies the processor that the data is processed. Then the processor needs to notify the accelerator to migrate the processing result from the secondary memory to the primary memory through DMA, so that the processor can read the processing result from the primary memory.

It can be learned that in the process in which the accelerator assists the processor in data processing, a quantity of times of information exchange between the processor and the accelerator is large, which affects data processing efficiency.

SUMMARY

This disclosure provides a data processing method and apparatus, and a heterogeneous system, to resolve a problem of low data processing efficiency. The technical solutions are as follows.

According to a first aspect, a heterogeneous system is provided. The heterogeneous system includes: a first processor, a first accelerator, which are connected, and a first secondary memory connected to the first accelerator, where the first processor is configured to write to-be-processed data into the first secondary memory, and trigger the first accelerator to process the to-be-processed data in the first secondary memory according to a processing instruction; and the first accelerator is configured to write a processing result of the to-be-processed data into the first secondary memory, and trigger the first processor to read the processing result from the first secondary memory.

It can be learned that in a data processing method provided in this embodiment, the first accelerator can assist the first processor in processing the to-be-processed data. Therefore, a data processing capability of the entire heterogeneous system is strong. In addition, in the data processing method, the first processor can directly write the to-be-processed data into the secondary memory connected to the first accelerator. Therefore, a process in which the first processor notifies the first accelerator to migrate the to-be-processed data from a primary memory connected to the first processor to the secondary memory is avoided, and a process in which the first accelerator migrates the to-be-processed data is also avoided. In addition, in the data processing method, the first accelerator can directly write the processing result into the secondary memory, and the first processor can obtain the processing result from the secondary memory. Therefore, a process in which the first accelerator notifies the first processor that the to-be-processed data is processed and the first processor notifies the first accelerator to migrate the processing result from the secondary memory to the primary memory is avoided. Therefore, in this embodiment, a quantity of times of interaction between the first processor and the first accelerator is small, and a procedure of the data processing method is simple. As a result, data processing efficiency is high.

Optionally, the first processor is connected to the first accelerator by using a cache coherence bus. The cache coherence bus is a bus that uses a cache coherence protocol. When the processor and the accelerator are connected by the cache coherence bus, all of the storage space of the primary memory, the storage space of the accelerator, and the storage space of the secondary memory in the heterogeneous system are visible to the processor. Unified addressing is performed on these storage spaces in the processor, so that the processor can perform reading and writing on these storage spaces based on addresses of these storage spaces.

Optionally, the cache coherence bus includes a CCIX bus or a CXL bus. Optionally, when the cache coherence bus includes a CCIX bus, the first processor includes an ARM architecture processor; or when the cache coherence bus includes a CXL bus, the first processor includes an x86 architecture processor.

Optionally, the secondary memory includes an HBM. Because the HBM can provide a storage function with a high bandwidth, data processing efficiency of the heterogeneous system can be improved. In addition, the HBM has a small volume, and an operating power of the HBM is small.

Optionally, the accelerator includes a GPU, an FPGA, or an ASIC. The accelerator may alternatively be another device having a data processing function. This is not limited in this disclosure.

Optionally, the heterogeneous system includes a plurality of accelerators connected to each other, where the first accelerator is any of the plurality of accelerators; the processing instruction carries an accelerator identifier, where the accelerator identifier is an identifier of an accelerator that is in the plurality of accelerators and that is configured to execute the processing instruction; and the first accelerator is configured to: when the accelerator identifier is an identifier of the first accelerator, process the to-be-processed data in the first secondary memory according to the processing instruction. It can be learned that when the heterogeneous system includes the plurality of accelerators, the first accelerator may determine, based on the accelerator identifier, whether the first accelerator is an accelerator that is specified by the processor and that is used to process the to-be-processed data.

Optionally, the heterogeneous system includes a plurality of secondary memories connected to the plurality of accelerators respectively, and a plurality of processors connected to each other. The first processor is any processor that is in the plurality of processors and that is connected to the first accelerator. The processing instruction further carries the identifier of the first processor. The first accelerator is configured to: when the accelerator identifier is not the identifier of the first accelerator, write the to-be-processed data into a secondary memory connected to a secondary accelerator indicated by the accelerator identifier, and trigger the secondary accelerator to process the to-be-processed data according to the processing instruction. The secondary accelerator is configured to: after the to-be-processed data is processed according to the processing instruction, write the processing result of the to-be-processed data into the connected secondary memory, and trigger, based on the identifier of the first processor carried in the processing instruction, the first processor to read the processing result from the secondary memory connected to the secondary accelerator. When the first processor sends the processing instruction to the first accelerator by mistake, the first accelerator can forward the processing instruction to the secondary accelerator, so that the secondary accelerator processes the to-be-processed data. In this case, an adverse consequence caused because the first processor sends the processing instruction by mistake can be avoided.

Optionally, the plurality of accelerators are connected by using a cache coherence bus, and the plurality of processors are connected by using a cache coherence bus.

Optionally, in the heterogeneous system, the processor may trigger, in a plurality of manners, the accelerator to process the to-be-processed data in the secondary memory according to the processing instruction, and the accelerator may trigger, in a plurality of manners, the processor to read the processing result from the secondary memory connected to the accelerator. For example, the processor triggers, by sending the processing instruction to the accelerator, the accelerator to process the foregoing to-be-processed data, and the accelerator triggers, by sending a processing response to the processor, the processor to read the processing result. For another example, the processor may trigger, by changing a state value of a register, the accelerator to process the to-be-processed data, and the accelerator may trigger, by changing the state value of the register, the processor to read the processing result.

According to a second aspect, a data processing method is provided and is applied to a first accelerator in a heterogeneous system, where the heterogeneous system further includes a first processor and a first secondary memory that are connected to the first accelerator; and the method includes: processing to-be-processed data in the first secondary memory according to a processing instruction due to triggering performed by the first processor; writing a processing result of the to-be-processed data into the first secondary memory; and triggering the first processor to read the processing result from the first secondary memory.

Optionally, the heterogeneous system includes a plurality of accelerators connected to each other, where the first accelerator is any of the plurality of accelerators; the processing instruction carries an accelerator identifier, where the accelerator identifier is an identifier of an accelerator that is in the heterogeneous system and that is configured to execute the processing instruction; and the first accelerator may process the to-be-processed data in the first secondary memory according to the processing instruction when the accelerator identifier is an identifier of the first accelerator.

Optionally, the heterogeneous system includes a plurality of secondary memories connected to the plurality of accelerators respectively and a plurality of processors connected to each other. The first processor is any processor that is in the plurality of processors and that is connected to the first accelerator. The processing instruction further carries the identifier of the first processor. The method further includes: when the accelerator identifier is not the identifier of the first accelerator, writing the to-be-processed data into a secondary memory connected to a secondary accelerator indicated by the accelerator identifier, and triggering the secondary accelerator to process the to-be-processed data according to the processing instruction.

Optionally, the first accelerator may trigger, in a plurality of manners, the first processor to read the processing result from the secondary memory connected to the first accelerator. For example, the first accelerator triggers, by sending a processing response to the first processor, the first processor to read the processing result. For another example, the first accelerator may trigger, by changing a state value of a register, the first processor to read the processing result.

According to a third aspect, a data processing method is provided and is applied to a secondary accelerator in a heterogeneous system, where the heterogeneous system includes a plurality of processors connected to each other, a plurality of accelerators connected to each other, and a plurality of secondary memories connected to the plurality of accelerators respectively; and the secondary accelerator and a first accelerator are any two connected accelerators in the plurality of accelerators. The method includes: processing, according to a processing instruction due to triggering performed by the first accelerator, to-be-processed data in a secondary memory connected to the secondary accelerator, where the processing instruction carries an identifier of a first processor connected to the first accelerator; writing a processing result of the to-be-processed data into the connected secondary memory; and triggering, based on the identifier of the first processor carried in the processing instruction, the first processor to read the processing result from the secondary memory connected to the secondary accelerator.

Optionally, the secondary accelerator may trigger, in a plurality of manners, the first processor to read the processing result from the secondary memory connected to the secondary accelerator. For example, the secondary accelerator triggers, by sending a processing response to the first processor, the first processor to read the processing result. For another example, the secondary accelerator may trigger, by changing a state value of a register, the first processor to read the processing result.

According to a fourth aspect, a data processing method is provided and is applied to a first processor in a heterogeneous system, where the heterogeneous system further includes a first accelerator connected to the first processor, and a first secondary memory connected to the first accelerator; and the method includes: writing to-be-processed data into the first secondary memory; triggering the first accelerator to process the to-be-processed data in the first secondary memory according to a processing instruction; and reading a processing result of the to-be-processed data from the first secondary memory due to triggering performed by the first accelerator.

Optionally, the heterogeneous system includes a plurality of processors connected to each other, a plurality of accelerators connected to each other, and a plurality of secondary memories connected to the plurality of accelerators respectively; the processing instruction carries an accelerator identifier and an identifier of the first processor, where the accelerator identifier is an identifier of an accelerator that is in the heterogeneous system and that is configured to execute the processing instruction; when the accelerator identifier is the identifier of the first accelerator, the first processor may read the processing result of the to-be-processed data from the first secondary memory due to triggering performed by the first accelerator; and when the accelerator identifier is an identifier of a secondary accelerator connected to the first accelerator, the first processor may read, due to triggering performed by the secondary accelerator, the processing result from a secondary memory connected to the secondary accelerator.

Optionally, the first processor may trigger, in a plurality of manners, the first accelerator to process the to-be-processed data in the first secondary memory according to the processing instruction. For example, the first processor triggers, by sending the processing instruction to the first accelerator, the first accelerator to process the to-be-processed data. For another example, the first processor may trigger, by changing a state value of a register, the first accelerator to process the to-be-processed data.

According to a fifth aspect, a data processing apparatus is provided and is applied in a first accelerator in a heterogeneous system, where the heterogeneous system further includes a first processor and a first secondary memory that are connected to the first accelerator. The data processing apparatus includes modules configured to implement the data processing method provided in the second aspect.

According to a sixth aspect, a data processing apparatus is provided and is applied to a secondary accelerator in a heterogeneous system, where the heterogeneous system includes a plurality of processors connected to each other, a plurality of accelerators connected to each other, and a plurality of secondary memories connected to the plurality of accelerators respectively; the secondary accelerator and a first accelerator are any two connected accelerators in the plurality of accelerators; and the data processing apparatus includes modules configured to implement the data processing method provided in the third aspect.

According to a seventh aspect, a data processing apparatus is provided and is applied to a first processor in a heterogeneous system, where the heterogeneous system further includes a first accelerator connected to the first processor, and a first secondary memory connected to the first accelerator; and the data processing apparatus includes modules configured to implement the data processing method provided in the fourth aspect.

An eighth aspect of this application provides a computer storage medium, where the storage medium stores a computer program, and when the computer program is run on a computer apparatus, the computer apparatus is enabled to perform the data processing method according to any one of the second aspect, the third aspect, or the fourth aspect of this disclosure.

A ninth aspect of this application provides a computer program product including instructions that, when run on a computer apparatus, enable the computer apparatus to perform the data processing method according to any one of the second aspect, the third aspect, or the fourth aspect of this disclosure.

For beneficial effects of the second aspect to the ninth aspect, refer to the beneficial effects described in the first aspect. Details are not described herein again.

DESCRIPTION OF EMBODIMENTS

To make principles and technical solutions of this disclosure more clear, the following further describes implementations in detail with reference to the accompanying drawings.

With the development of computer technologies, a heterogeneous system with a strong data processing ability is gaining momentum. The heterogeneous system can achieve efficient data processing, for example, online prediction processing based on deep learning, video transcoding for live streaming, and image compression or decompression.

Figure 1:
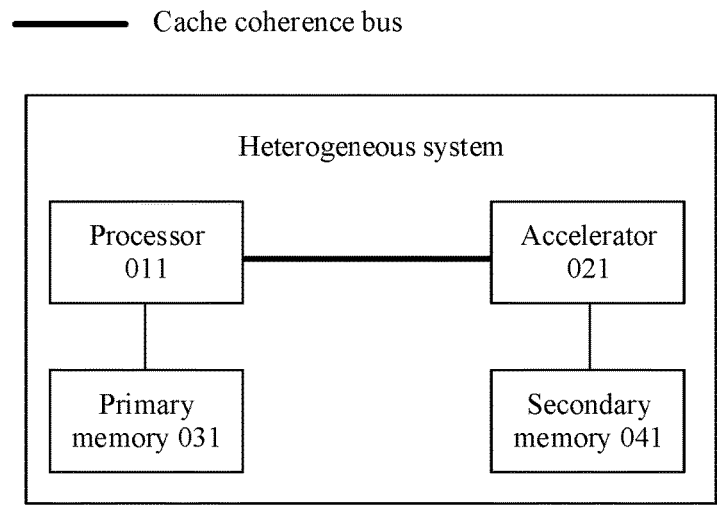
FIG. 1 is a schematic diagram of a structure of a heterogeneous system according to an embodiment.

For example, FIG. 1 is a schematic diagram of an exemplary structure of a heterogeneous system according to an embodiment of this disclosure. As shown in FIG. 1, the heterogeneous system includes: at least one processor and at least one accelerator. FIG. 1 is an example of the heterogeneous system including one processor 011 and one accelerator 021. However, a quantity of processors and a quantity of accelerators in the heterogeneous system may also be greater than 1. This is not limited in this disclosure.

Figure 2:
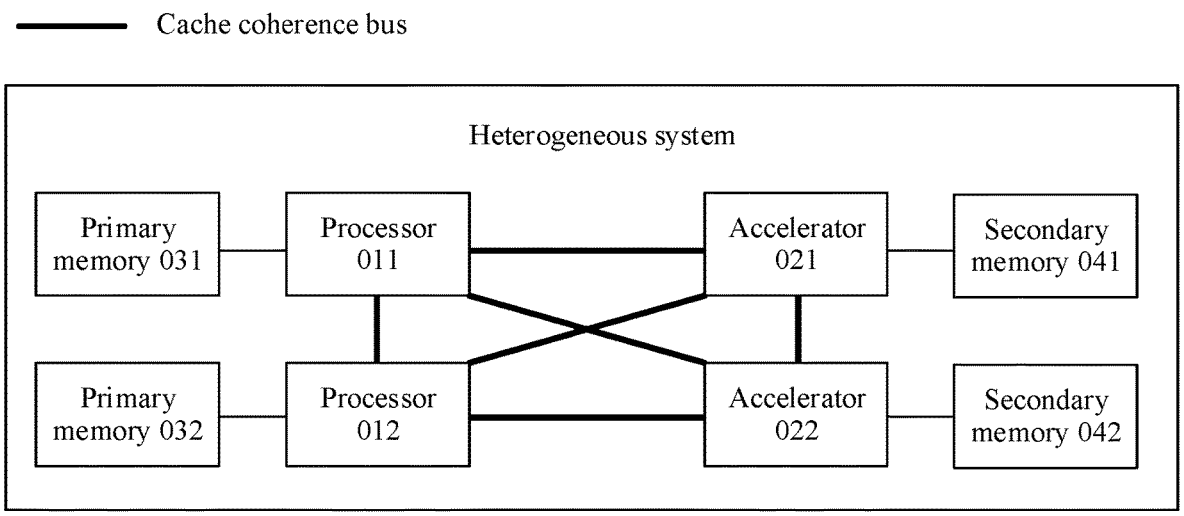
FIG. 2 is a schematic diagram of a structure of another heterogeneous system according to an embodiment.
Figure 3:
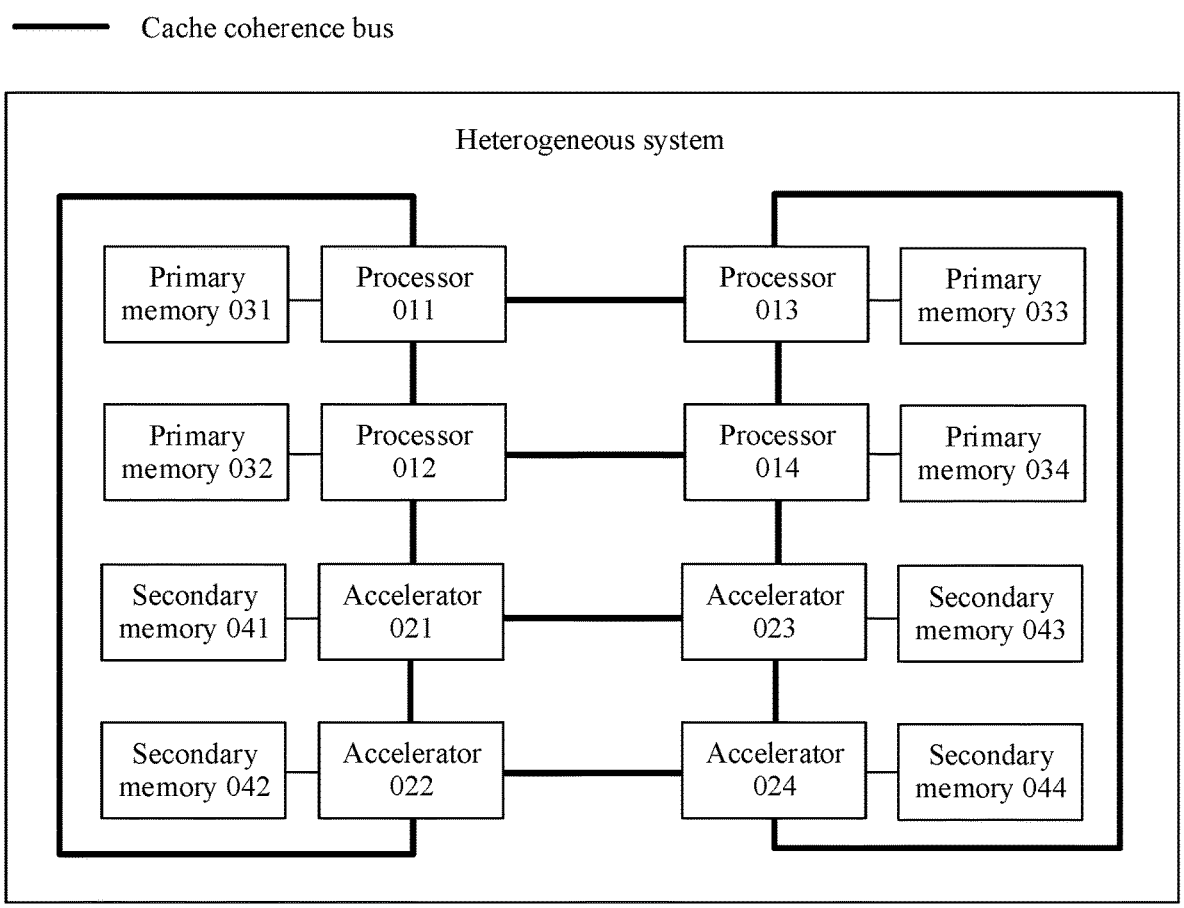
FIG. 3 is a schematic diagram of a structure of another heterogeneous system according to an embodiment.

For example, as shown in FIG. 2, the at least one processor in the heterogeneous system may include the processor 011 and a processor 012, and the at least one accelerator includes the accelerator 021 and an accelerator 022. For another example, as shown in FIG. 3, the at least one processor in the heterogeneous system may include the processor 011, the processor 012, a processor 013, and a processor 014, and the at least one accelerator includes the accelerator 021, the accelerator 022, an accelerator 023, and an accelerator 024. It can be learned from connection relationships between devices shown in FIG. 2 and FIG. 3 that when the heterogeneous system includes a plurality of processors, the processors are connected to each other by a cache coherence bus (some processors are directly connected, and some are indirectly connected). When the heterogeneous system includes a plurality of accelerators, the accelerators are connected to each other by a cache coherence bus (some accelerators are directly connected, and some processors are indirectly connected). Each processor is connected to at least one accelerator.

Both the processor and the accelerator in the heterogeneous system have a data processing function. In addition, the accelerator is configured to assist the processor in performing some data processing to enhance a data processing capability of the heterogeneous system. The processor may be a processor of any type, for example, an advanced reduced instruction set computing machine (ARM) architecture processor or an x86 architecture processor. The ARM architecture processor and the x86 architecture processor are names of processors of two different architectures. Protocols, power consumption, performance, and costs of the two types of processors are different. The accelerator may be any device having a data processing function, for example, a graphics processing unit (GPU), a field programmable gate array (FPGA), or an application specific integrated circuit (ASIC).

Further, each processor in the heterogeneous system may be connected to a primary memory, and each accelerator may be connected to a secondary memory. In this case, the heterogeneous system further includes: the primary memory connected to each processor and the secondary memory connected to each accelerator. Refer to FIG. 1. For example, the heterogeneous system further includes a primary memory 031 connected to the processor 011 and a secondary memory 041 connected to the accelerator 021. Refer to FIG. 2. The heterogeneous system further includes: the primary memory 031 connected to the processor 011, a primary memory 032 connected to the processor 012, a secondary memory 041 connected to the accelerator 021, and a secondary memory 042 connected to the accelerator 022. Refer to FIG. 3. The heterogeneous system further includes: the primary memory 031 connected to the processor 011, the primary memory 032 connected to the processor 012, a primary memory 033 connected to the processor 013, a primary memory 034 connected to the processor 014, the secondary memory 041 connected to the accelerator 021, the secondary memory 042 connected to the accelerator 022, a secondary memory 043 connected to the accelerator 023, and a secondary memory 044 connected to the accelerator 024.

Both the primary memory and the secondary memory in the heterogeneous system may be memories of any type, for example, a double data rate synchronous dynamic random access memory (DDR) or a high bandwidth memory (HBM). In embodiments of this disclosure, an example in which the primary memory is a DDR and the secondary memory is an HBM is used. When the heterogeneous system includes the HBM, because the HBM can provide a storage function with a high bandwidth, data processing efficiency of the heterogeneous system can be improved. In addition, the HBM has a small volume, and an operating power of the HBM is small.

In addition, the primary memory in the heterogeneous system may be independent of the connected processor, and the secondary memory may be independent of the connected accelerator; alternatively, the primary memory may be integrated into the connected processor, and the secondary memory may be integrated into the connected accelerator. In embodiments of this application, an example in which the primary memory is independent of the connected processor and the secondary memory is integrated into the connected accelerator is used (an integration relationship is not shown in FIG. 1).

According to a related technology, the processor and the accelerator in the heterogeneous system are connected by a PCIE bus. Both storage space of the primary memory connected to the processor and storage space of the accelerator connected to the processor are visible to the processor, and the processor can perform reading and writing on the storage spaces. However, a storage space of the secondary memory connected to the accelerator is invisible to the processor, and the processor cannot perform reading or writing on the storage space. Therefore, according to the related technology, when the processor needs to control the accelerator to process data, the processor first needs to write the data into the primary memory, and notify the accelerator to migrate the to-be-processed data in the primary memory to the secondary memory through DMA. Then the processor further needs to notify the accelerator to process the data in the secondary memory. After processing the data, the accelerator writes a processing result into the secondary memory, and notifies the processor that the data is processed. Then the processor needs to notify the accelerator to migrate the processing result from the secondary memory to the primary memory through DMA. As a result, the processor can read the processing result from the primary memory. It can be learned that in the process in which the accelerator assists the processor in data processing, a quantity of times of information exchange between the processor and the accelerator is large, which affects data processing efficiency.

In embodiments of this disclosure, the processor and the accelerator in the heterogeneous system are connected by a cache coherence bus. The cache coherence bus is a bus that uses a cache coherence protocol. When the processor and the accelerator are connected by the cache coherence bus, all of the storage space of the primary memory, the storage space of the accelerator, and the storage space of the secondary memory in the heterogeneous system are visible to the processor. Unified addressing is performed on these storage spaces in the processor, so that the processor can perform reading and writing on these storage spaces based on addresses of these storage spaces.

The cache coherence bus may be any bus that uses a cache coherence protocol, for example, a cache coherent interconnect for accelerators (CCIX) bus or a compute express link (CXL) bus. Optionally, when the cache coherence bus is the CCIX bus, the processor may be the foregoing ARM architecture processor; or when the cache coherence bus is the CXL bus, the processor may be the foregoing x86 architecture processor. A type of the cache coherence bus and a type of the processor are not limited in embodiments of this application.

On the basis that the processor and the accelerator are connected by the cache coherence bus, an embodiment of this disclosure provides a data processing method applied to the heterogeneous system. According to the data processing method, the accelerator can assist the processor in data processing, and also reduce the quantity of times of interaction between the processor and the accelerator, thereby improving data processing efficiency.

The data processing method provided in embodiments of this disclosure can be applied to a heterogeneous system as described herein (for example, the heterogeneous system shown in any one of FIG. 1 to FIG. 3). The method relates to a first processor, a first accelerator, and a first secondary memory in the heterogeneous system, where the first processor is any processor in the heterogeneous system, the first accelerator is any accelerator connected to the first processor, and the first secondary memory is a secondary memory connected to the first accelerator.

Figure 4:
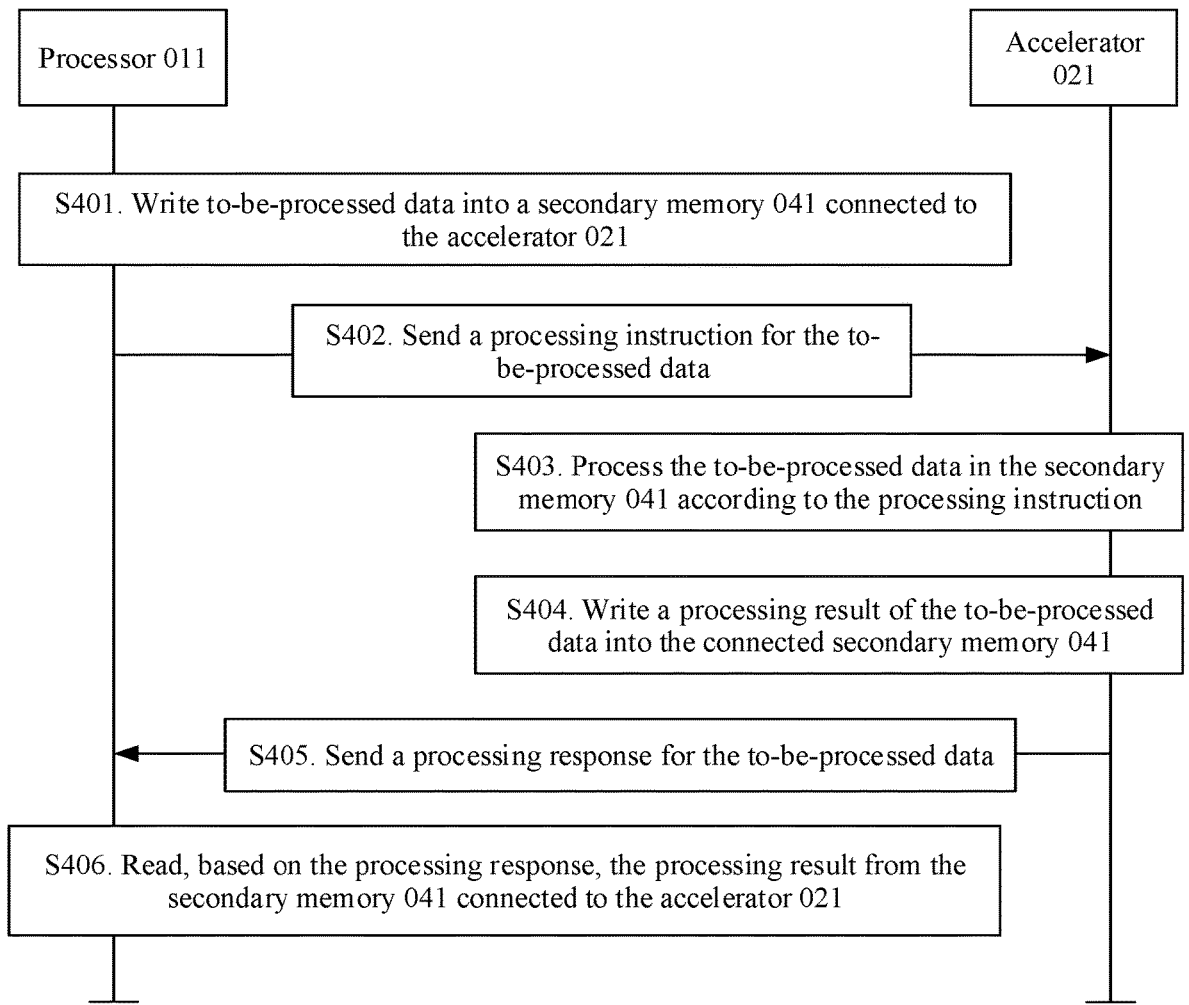
FIG. 4 is a flowchart of a data processing method according to an embodiment

For example, FIG. 4 is a flowchart of a data processing method according to an embodiment. FIG. 4 shows an example in which a first processor is the processor 011 in FIG. 1, a first accelerator is the accelerator 021 in FIG. 1, and a secondary memory connected to the first accelerator is the secondary memory 041 in FIG. 1. As shown in FIG. 4, the data processing method may include the following steps.

S401. The processor 011 writes to-be-processed data into the secondary memory 041 connected to the accelerator 021.

In this embodiment, because the processor 011 and the accelerator 021 are connected by a cache coherence bus, storage spaces of the primary memory, the accelerator, and the secondary memory in the heterogeneous system are visible to the processor 011. When the heterogeneous system is started, all processors (for example, basic input/output systems (BIOSs) in all processors) in the heterogeneous system need to perform unified addressing on the storage spaces of the primary memory, the accelerator, and the secondary memory in the system. In this way, after each processor in the heterogeneous system obtains an address of each storage unit in the storage spaces (a minimum storage unit in the storage spaces), the processor in the heterogeneous system can directly read and write data at the address.

For example, it is assumed that a storage space of the primary memory 031 in FIG. 1 includes a storage unit 1 and a storage unit 2, a storage space on the accelerator 021 (for example, storage spaces of some I/O (input/output) registers on the accelerator 021) includes a storage unit 3 and a storage unit 4, and a storage space on the secondary memory 041 includes a storage unit 5 and a storage unit 6. After performing unified addressing on these storage spaces, the processor 011 may obtain addresses A, B, C, D, E, and F of the storage units shown in Table 1.

| Device | Storage space | Address |
| --- | --- | --- |
| Primary memory 031 | Storage unit 1 | A |
|  | Storage unit 2 | B |
| Accelerator 021 | Storage unit 3 | C |
|  | Storage unit 4 | D |
| Secondary memory 041 | Storage unit 5 | E |
|  | Storage unit 6 | F |

In S401, the processor 011 may write the to-be-processed data into at least one storage unit in the secondary memory 041 according to the address of each storage unit in the secondary memory 041. It should be noted that the to-be-processed data may be data generated by the processor 011, or data sent by another device outside the heterogeneous system, or the to-be-processed data may be data stored in the primary memory 031 by the processor 011 before S401. This is not limited in this embodiment of this disclosure.

S402. The processor 011 sends a processing instruction for the to-be-processed data to the accelerator 021.

The processing instruction instructs the accelerator 021 to perform specific processing on the to-be-processed data. Therefore, the processing instruction may carry a storage address of the to-be-processed data in the secondary memory connected to the accelerator 021, and indication information of the specific processing. For example, the specific processing may be processing based on a machine learning algorithm, a deep learning algorithm, a financial risk control algorithm, or the like. The processing indicated by the processing instruction is not limited in this embodiment of this disclosure.

S403. The accelerator 021 processes the to-be-processed data in the secondary memory 041 according to the processing instruction.

After receiving the processing instruction, the accelerator 021 may parse the processing instruction to determine the address of the to-be-processed data indicated by the processing instruction and processing that needs to be performed on the to-be-processed data. The accelerator 021 may read the to-be-processed data from the connected secondary memory 041, and perform the processing indicated by the processing instruction on the to-be-processed data, to obtain a processing result of the to-be-processed data.

S404. The accelerator 021 writes a processing result of the to-be-processed data into the connected secondary memory 041.

S405. The accelerator 021 sends a processing response for the to-be-processed data to the processor 011.

The processing response indicates the processor 011 to obtain a processing result of the to-be-processed data. Therefore, the processing response needs to carry a storage address of the processing result in the secondary memory connected to the accelerator 021.

S406. The processor 011 reads, based on the processing response, the processing result from the secondary memory 041 connected to the accelerator 021.

For example, the processing response carries the storage address of the processing result in the secondary memory 041 connected to the accelerator 021. Therefore, the processor 011 may read the processing result according to the storage address.

It can be learned that in the data processing method provided in this embodiment of this application, the first accelerator (for example, the accelerator 021) can assist the first processor (for example, the processor 011) in processing the to-be-processed data. Therefore, a data processing capability of the entire heterogeneous system is strong.

In addition, in the data processing method, the first processor (for example, the processor 011) can directly write the to-be-processed data into the secondary memory (for example, the secondary memory 041) connected to the first accelerator (for example, the accelerator 021). Therefore, a process in which the first processor notifies the first accelerator to migrate the to-be-processed data from the primary memory connected to the first processor to the secondary memory is avoided, and a process in which the first accelerator migrates the to-be-processed data is also avoided.

In addition, in the data processing method, the first accelerator can directly write the processing result into the secondary memory, and the first processor can obtain the processing result from the secondary memory. Therefore, a process in which the first accelerator notifies the first processor that the to-be-processed data is processed and the first processor notifies the first accelerator to migrate the processing result from the secondary memory to the primary memory is avoided.

Therefore, in this embodiment of this application, a quantity of times of interaction between the first processor and the first accelerator is small, and a procedure of the data processing method is simple. As a result, data processing efficiency is high.

In addition, to further improve the data processing efficiency of the heterogeneous system, in this embodiment of this application, a cache coherence bus with a high transmission bandwidth may be used, for example, a cache coherence bus with a transmission bandwidth of 25 gigabits per second (GT/s).

In the embodiment shown in FIG. 4, the heterogeneous system shown in FIG. 1 is used as an example. When the heterogeneous system includes a plurality of accelerators connected to each other by using a cache coherence bus (such as the heterogeneous system shown in FIG. 2 or FIG. 3), the data processing method further relates to a secondary accelerator in the heterogeneous system and a secondary memory connected to the secondary accelerator.

Figure 5A:
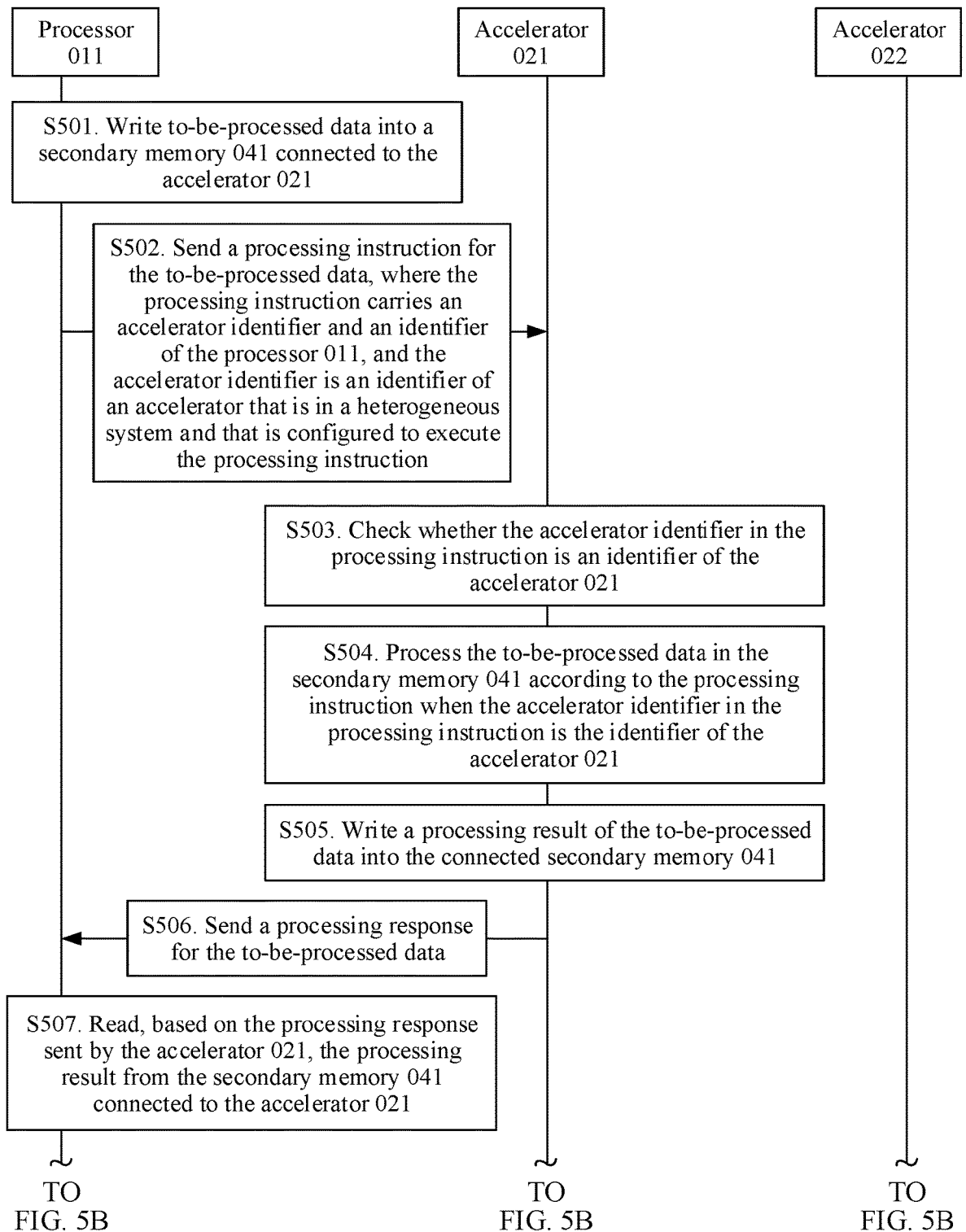
FIG. 5A and FIG. 5B are a flowchart of another data processing method according to an embodiment.
Figure 5B:
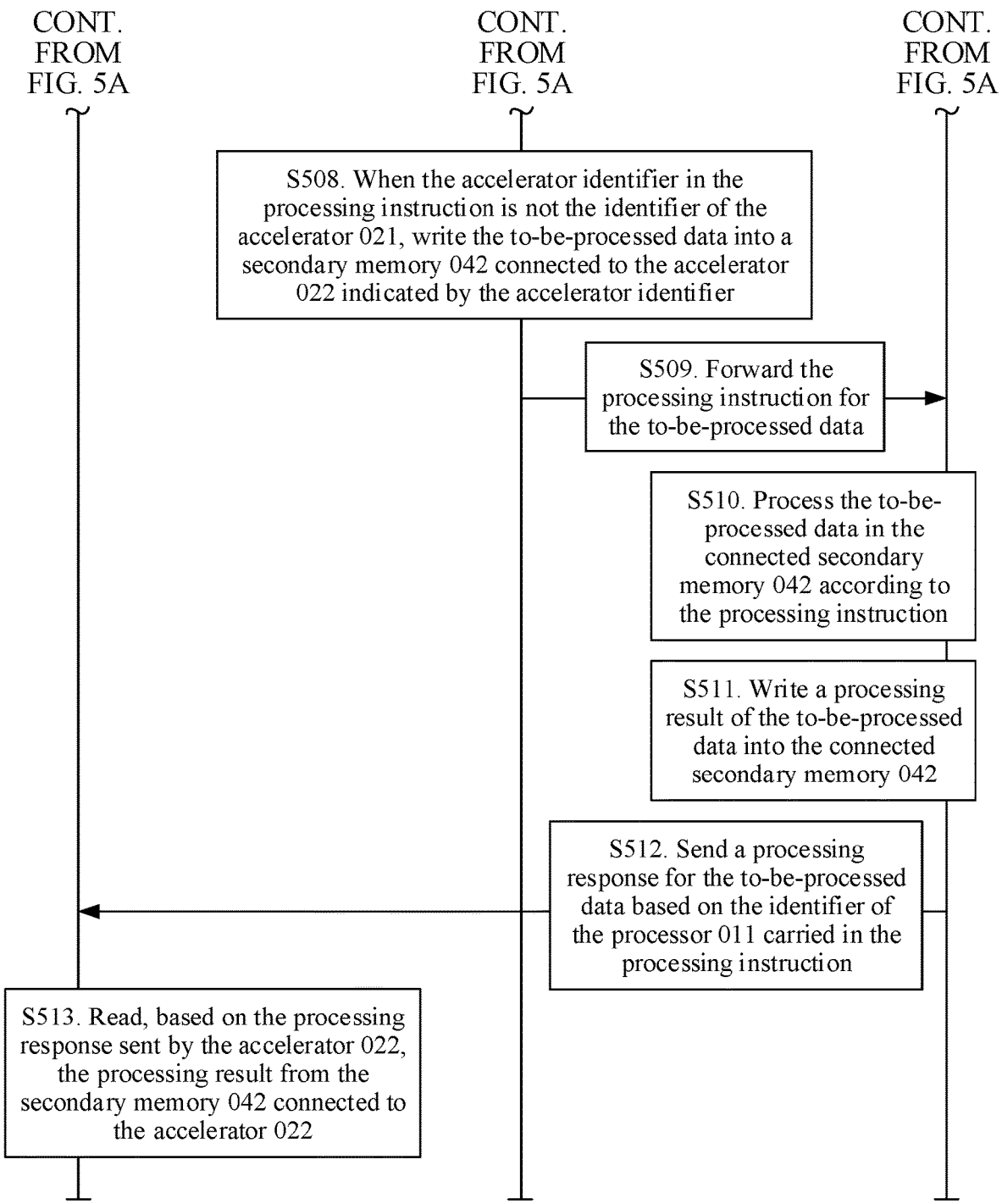

For example, in this case, the data processing method may be a method shown in FIG. 5A and FIG. 5B. FIG. 5A and FIG. 5B show an example in which a first processor is the processor 011 in FIG. 2, a first accelerator is the accelerator 021 in FIG. 2, a secondary memory connected to the first accelerator (which may be referred to as a first secondary memory) is the secondary memory 041 in FIG. 2, a secondary accelerator is the accelerator 022 in FIG. 2, and a secondary memory connected to the secondary accelerator is the secondary memory 042 in FIG. 2. Refer to FIG. 5A and FIG. 5B. The data processing method may include the following steps.

S501. The processor 011 writes to-be-processed data into the secondary memory 041 connected to the accelerator 021, and performs S502.

For S501, refer to S401. Details are not described in this embodiment of this disclosure.

S502. The processor 011 sends a processing instruction for the to-be-processed data to the accelerator 021, where the processing instruction carries an accelerator identifier and an identifier of the processor 011, and the accelerator identifier is an identifier of an accelerator that is in the heterogeneous system and that is configured to execute the processing instruction, and performs S503.

For S502, refer to S402. Details are not described in this embodiment of this disclosure.

In addition, in this embodiment, because the heterogeneous system includes the plurality of accelerators, to associate the processing instruction with the accelerator configured to execute the processing instruction, the processing instruction carries the identifier of the accelerator configured to execute the processing instruction. In addition, when the heterogeneous system includes the plurality of processors, to associate the processing instruction with the processor that sends the processing instruction, the processing instruction needs to carry an identifier of the processor 011 that sends the processing instruction.

S503. The accelerator 021 checks whether the accelerator identifier in the processing instruction is an identifier of the accelerator 021. If the accelerator identifier in the processing instruction is the identifier of the accelerator 021, S504 is performed; or if the accelerator identifier in the processing instruction is not the identifier of the accelerator 021, S508 is performed.

Because the heterogeneous system in this embodiment includes the plurality of accelerators, to prevent the first processor from sending the processing instruction by mistake, after receiving the processing instruction sent by the processor 011, the accelerator 021 needs to check whether the accelerator identifier carried in the processing instruction is the same as the identifier of the accelerator 021, and determine whether the accelerator 021 is the accelerator that is specified by the processor 011 and that is configured to execute the processing instruction.

When the accelerator identifier in the processing instruction is the identifier of the accelerator 021, the accelerator 021 may determine that the accelerator 021 is the accelerator that is specified by the processor 011 and that is configured to execute the processing instruction. In this case, the accelerator 021 may perform S504, to perform corresponding data processing according to the processing instruction.

When the accelerator identifier in the processing instruction is not the identifier of the accelerator 021, the accelerator 021 may determine that the accelerator 021 is not the accelerator that is specified by the processor 011 and that is configured to execute the processing instruction. In this case, the accelerator 021 may perform S508, to trigger the accelerator 022 specified by the processor 011 to perform corresponding data processing according to the processing instruction.

S504. The accelerator 021 processes the to-be-processed data in the secondary memory 041 according to the processing instruction, and performs S505.

For S504, refer to S403. Details are not described in this embodiment of this disclosure.

S505. The accelerator 021 writes a processing result of the to-be-processed data into the connected secondary memory 041, and performs S506.

For S505, refer to S404. Details are not described in this embodiment of this disclosure.

S506. The accelerator 021 sends a processing response for the to-be-processed data to the processor 011, and perform S507.

For S506, refer to S405. Details are not described in this embodiment of this disclosure.

S507. The processor 011 reads, based on the processing response sent by the accelerator 021, the processing result from the secondary memory 041 connected to the accelerator 021.

For S507, refer to S406. Details are not described in this embodiment of this disclosure.

S508. The accelerator 021 writes the to-be-processed data into the secondary memory 042 connected to the accelerator 022 indicated by the accelerator identifier.

S509. The accelerator 021 forwards the processing instruction for the to-be-processed data to the accelerator 022, and performs S510.

Because the accelerators in the heterogeneous system in this embodiment of this application are connected to each other, the accelerator 021 is connected to the accelerator 022. Due to the connection, the accelerator 021 can write the to-be-processed data into the secondary memory 042 connected to the accelerator 022, and send the processing instruction to the accelerator 022.

S510. The accelerator 022 processes, according to the processing instruction, the to-be-processed data in the connected secondary memory 042, and performs step S511.

For a processing process in S510, refer to the processing process in S403. Details are not described herein in this embodiment of this disclosure.

S511. The accelerator 022 writes a processing result of the to-be-processed data into the connected secondary memory 042, and performs S512.

For a process of writing the processing result in S511, refer to the process of writing the processing result in S404. Details are not described herein in this embodiment of this disclosure.

S512. The accelerator 022 sends a processing response for the to-be-processed data to the processor 011 based on the identifier of the processor 011 carried in the processing instruction, and performs S513.

Because the processing instruction carries the identifier of the processor 011 that sends the processing instruction, after executing the processing instruction sent by the accelerator 021, the accelerator 022 may send the processing response to the processor 011 based on the identifier of the processor 011, to indicate the processor 011 to obtain the processing result of the to-be-processed data. In this case, the processing response needs to carry a storage address of the processing result in the secondary memory 042 connected to the accelerator 022.

S513. The processor 011 reads, based on the processing response sent by the accelerator 022, the processing result from the secondary memory 042 connected to the accelerator 022.

For a process of reading the processing result in S513, refer to the process of reading the processing result in S406. Details are not described herein in this embodiment.

It can be learned that in the data processing method provided in this embodiment of this application, the first accelerator (for example, the accelerator 021) or the secondary accelerator (for example, the accelerator 022) can assist the first processor (for example, the processor 011) in processing the to-be-processed data. Therefore, a data processing capability of the entire heterogeneous system is strong.

In addition, in the data processing method, the first processor can directly write the to-be-processed data into the secondary memory (for example, the secondary memory 041) connected to the first accelerator. Therefore, a process in which the first processor notifies the first accelerator to migrate the to-be-processed data from the primary memory connected to the first processor to the secondary memory is avoided, and a process in which the first accelerator migrates the to-be-processed data is also avoided.

In addition, in the data processing method, the first accelerator or the secondary accelerator can directly write the processing result into the secondary memory, and the first processor can obtain the processing result from the secondary memory. Therefore, a process in which the first accelerator or the secondary accelerator notifies the first processor that the to-be-processed data is processed and the first processor notifies the first accelerator or the secondary accelerator to migrate the processing result from the secondary memory to the primary memory is avoided.

Therefore, in this embodiment of this application, a quantity of times of interaction between the first processor and the first accelerator or the secondary accelerator is small, and a procedure of the data processing method is simple. As a result, data processing efficiency is high.

In addition, to further improve the data processing efficiency of the heterogeneous system, in this embodiment of this application, a cache coherence bus with a high transmission bandwidth may be used, for example, a cache coherence bus with a transmission bandwidth of 25 gigabits per second (GT/s).

Optionally, when the heterogeneous system includes the plurality of accelerators, the processor in the heterogeneous system may control, according to the data processing method shown in FIG. 5A and FIG. 5B, the plurality of accelerators to perform data processing in parallel, which further improves the data processing efficiency of the entire heterogeneous system.

It can be learned from the foregoing embodiments (S402 and S403 in the embodiment shown in FIG. 4, or S502 and S504 in the embodiment shown in FIG. 5A and FIG. 5B) that the first processor may trigger the first accelerator to process the to-be-processed data in the connected secondary memory according to the processing instruction. It can be learned from the foregoing embodiments (S405 and S406 in the embodiment shown in FIG. 4, or S506 and S507 in the embodiment shown in FIG. 5A and FIG. 5B) that the first accelerator may trigger the first processor to read the processing result from the secondary memory connected to the first accelerator.

The foregoing embodiments describe an example in which the first processor triggers, by sending the processing instruction to the first accelerator, the first accelerator to perform data processing, and the first accelerator triggers, by sending the processing response to the first processor, the first processor to read the processing result. Optionally, the first processor may trigger, not by sending the processing instruction to the first accelerator, the first accelerator to perform data processing, and the first accelerator may trigger, not by sending the processing response to the first processor, the first processor to read the processing result.

For example, the storage space of the secondary memory may include three types of storage units, which are respectively: a data storage unit configured to store data, an instruction storage unit configured to store a processing instruction, and a result storage unit configured to store a processing result. In addition, there may be a correspondence between an I/O register in the first accelerator and the data storage unit, the instruction storage unit, and the result storage unit that are in the secondary memory connected to the first accelerator. Both the first processor and the first accelerator can obtain the correspondence, and perform the foregoing data processing method based on the correspondence.

For example, when writing the to-be-processed data into a specific data storage unit in the secondary memory connected to the first accelerator, the first processor may write, based on the correspondence, the processing instruction into an instruction storage unit corresponding to the data storage unit, and modify a state value of an I/O register corresponding to the data storage unit. The I/O register may have a plurality of state values, and the plurality of state values may include a first state value and a second state value. Before the first processor changes a state value of an I/O register in the first accelerator, the state value of the I/O register is the first state value. After the first processor changes the state value of the I/O register in the first accelerator, the state value of the I/O register is changed to the second state value. When the first accelerator detects that a state value of a specific I/O register changes to the second state value, the first accelerator may obtain, based on the foregoing correspondence, a processing instruction from an instruction storage unit corresponding to the I/O register, and read to-be-processed data from a data storage unit corresponding to the I/O register. Then the first accelerator may process the to-be-processed data according to the processing instruction, to obtain a processing result of the to-be-processed data.

After obtaining the processing result of the to-be-processed data, the first accelerator may modify the state value of the I/O register based on the correspondence, and write the processing result of the to-be-processed data into a result storage unit corresponding to the I/O register. The plurality of state values of the I/O register may further include a third state value. After the first accelerator obtains the processing result, the first accelerator may change the state value of the I/O register to the third state value. The first processor may detect whether an I/O register with the third state value exists in the first accelerator. When the first accelerator changes a state value of a specific I/O register to the third state value, the first processor may read, based on the foregoing correspondence, a processing result of to-be-processed data from a result storage unit corresponding to the I/O register.

For example, it is assumed that the foregoing correspondence is a correspondence shown in Table 2, and when the processor 011 does not change a state value of an I/O register in the accelerator 021, a state value of each I/O register is a first state value 0 shown in Table 2. If the processor 011 writes the to-be-processed data into a data storage unit 1.1 and writes the processing instruction into an instruction storage unit 2.1, the processor 011 may further change a state value of an I/O register 3.1 from the first state value 0 to a second state value 1 shown in Table 3. In this case, the accelerator 021 can detect that the state value of the I/O register 3.1 changes to the second state value 1, obtain the to-be-processed data from the data storage unit 1.1 corresponding to the I/O register 3.1, obtain the processing instruction from the instruction storage unit 2.1 corresponding to the I/O register 3.1, and process the to-be-processed data according to the processing instruction to obtain the processing result of the to-be-processed data. Then the accelerator 021 may write the processing result into a result storage unit 4.1 corresponding to the data storage unit 1.1, and change the state value of the I/O register 3.1 corresponding to the data storage unit 1.1 to the third state value 2 shown in Table 4. When detecting that the state value of the I/O register 3.1 is the third state value 2, the processor 011 may obtain the processing result of the to-be-processed data from the result storage unit 4.1 corresponding to the I/O register 3.1.

TABLE 2

| Data storage unit | Instruction storage unit | Result storage unit | I/O register | State value |
|---|---|---|---|---|
| 1.1 | 2.1 | 4.1 | 3.1 | 0 |
| 1.2 | 2.2 | 4.2 | 3.2 | 0 |
| 1.3 | 2.3 | 4.3 | 3.3 | 0 |

TABLE 3

| Data storage unit | Instruction storage unit | Result storage unit | I/O register | State value |
|---|---|---|---|---|
| 1.1 | 2.1 | 4.1 | 3.1 | 1 |
| 1.2 | 2.2 | 4.2 | 3.2 | 0 |
| 1.3 | 2.3 | 4.3 | 3.3 | 0 |

TABLE 4

| Data storage unit | Instruction storage unit | Result storage unit | I/O register | State value |
|---|---|---|---|---|
| 1.1 | 2.1 | 4.1 | 3.1 | 2 |
| 1.2 | 2.2 | 4.2 | 3.2 | 0 |
| 1.3 | 2.3 | 4.3 | 3.3 | 0 |

It can be learned that in embodiments of this disclosure, the first processor may alternatively trigger, by changing the state value of the I/O register, the first accelerator to perform data processing, and the first accelerator may trigger, by changing the state value of the I/O register, the first processor to read the processing result.

Optionally, after the first processor reads the processing result, the first accelerator may change the state value of the I/O register corresponding to the result storage unit in which the processing result is stored to the first state value. In this way, data processing performed next time by the first accelerator can be triggered by the first processor through changing the state value of the I/O register, and processing result reading performed next time by the first processor can be triggered by the first accelerator through changing the state value of the I/O register.

It can be learned from S509 and S510 in the embodiment shown in FIG. 5A and FIG. 5B that the first accelerator may trigger the secondary accelerator to process the to-be-processed data in the connected secondary memory according to the processing instruction. It can be learned from S512 and S513 in the embodiment shown in FIG. 5A and FIG. 5B that the secondary accelerator may trigger the first processor to read the processing result from the secondary memory connected to the secondary accelerator.

S509 and S510 describe an example in which the first accelerator triggers, by sending the processing instruction to the secondary accelerator, the secondary accelerator to perform data processing. S512 and S513 describe an example in which the secondary accelerator triggers, by sending the processing response to the first processor, the first processor to read the processing result. Optionally, the first accelerator may trigger, not by sending the processing instruction to the secondary accelerator, the secondary accelerator to perform data processing, and the secondary accelerator may trigger, not by sending the processing response to the first processor, the first processor to read the processing result.

For example, in S509 and S510, the first accelerator may trigger the secondary accelerator to perform data processing with reference to the process in which the first processor triggers, by changing the state value of the I/O register, the first accelerator to perform data processing. In S512 and S513, with reference to the process in which the first accelerator triggers, by changing the state value of the I/O register, the first processor to read the processing result, the secondary accelerator may trigger the first processor to read the processing result. Details are not described in this embodiment of this disclosure.

In the foregoing embodiment, functions of the devices in the heterogeneous system are briefly described by describing the data transmission method applied to the heterogeneous system. The following further describes functional modules of devices in the heterogeneous system.

Figure 6:
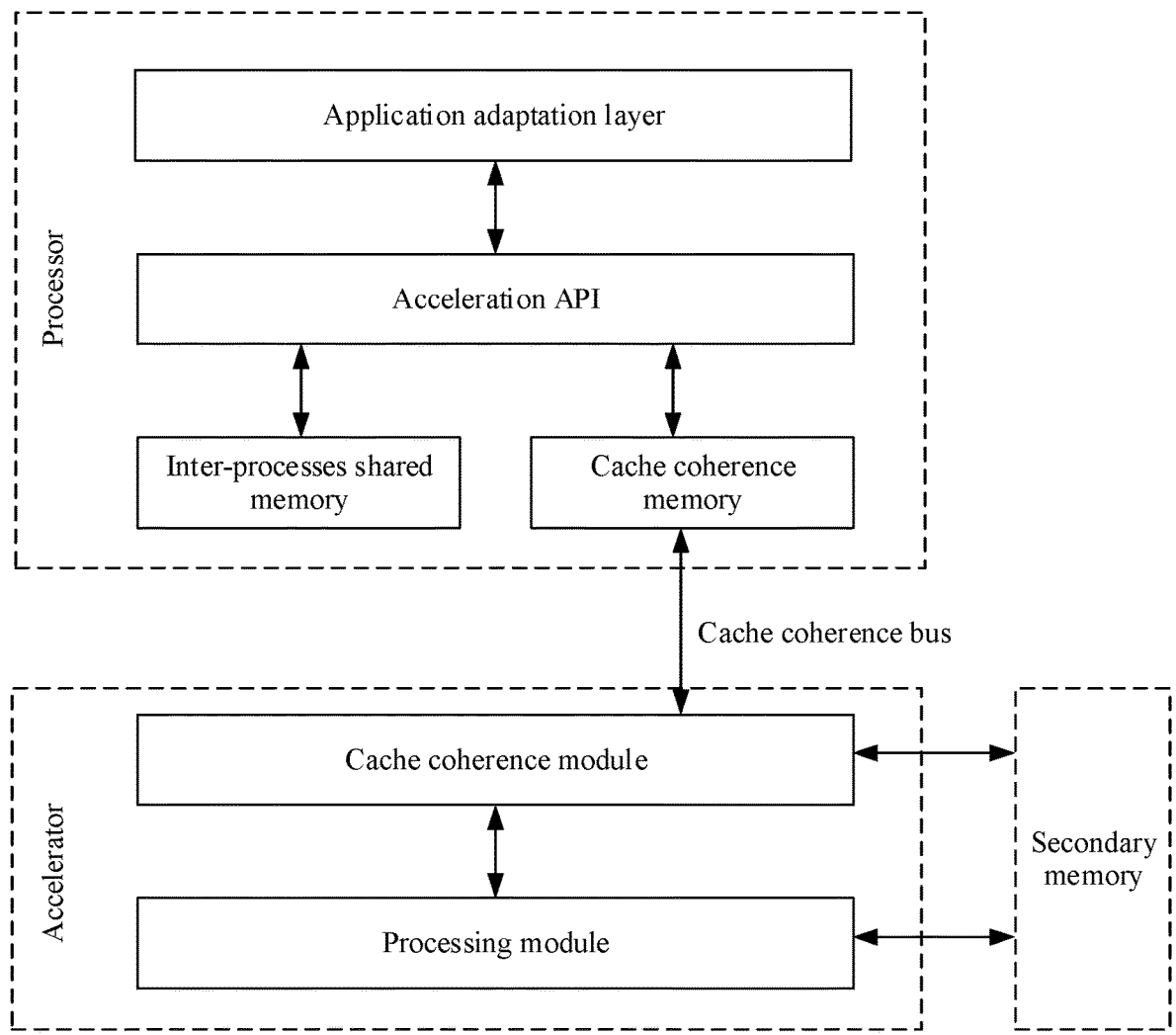
FIG. 6 is a schematic diagram of functional modules of a heterogeneous system according to an embodiment.

For example, FIG. 6 is a schematic diagram of functional modules of a heterogeneous system according to an embodiment. In FIG. 6, a group including a processor, an accelerator, and a secondary memory that are connected in the heterogeneous system is used as an example. When the heterogeneous system includes a plurality of groups of such structure, for functional modules in each group of such structure, refer to FIG. 6.

As shown in FIG. 6, the processor may include an disclosure adaptation layer, an acceleration application programming interface (API), an inter-process shared memory, and a cache coherence memory. The accelerator may include a cache coherence module and a processing module. The cache coherence memory in the processor is connected to the cache coherence module in the accelerator by using a cache coherence bus. Both the cache coherence module and the processing module are connected to a secondary memory.

In the processor, application software running in the processor can invoke the acceleration API by invoking the application adaptation layer. The acceleration API is used to implement data conversion and control between the application software and the accelerator. The inter-process shared memory is used for communication between a plurality of processes running in the processor. The cache coherence memory is configured to implement communication between the processor and the accelerator.

In the accelerator, the processing module is configured to perform a processing operation performed by the accelerator in the foregoing data processing method, and the processing module may further trigger the cache coherence module to perform a read/write operation performed by the accelerator in the foregoing data processing method.

In the foregoing data processing method, both reading and writing of data in the secondary memory performed by the processing module in the accelerator and the processor need to be implemented by the foregoing cache coherence module. For example, when the processor or the processing module in the accelerator needs to read/write the data in the secondary memory, the processor or the processing module in the accelerator may send a read/write request to the cache coherence module. The cache coherence module may generate a request agent (RA) (not shown in FIG. 6) for each received read/write request, and the RA performs a corresponding read/write operation. In addition, when reading data in the secondary memory, each RA caches a copy of the data, so that reading of the data can be implemented next time by reading the local copy, and the data does not need to be read from the secondary memory again.

The cache coherence module further includes: a host agent (HA) (not shown in FIG. 6), where the HA is configured to manage all RAs in the cache coherence module, to achieve cache coherence.

For example, when reading or writing data in the secondary memory, each RA needs to first send, to the HA, a request for reading or writing data in the secondary memory.

For an RA that is in the plurality of RAs and that is used to read data (for example, read data such as a processing instruction, to-be-processed data, or a processing result), after receiving a data read request sent by the RA, the HA grants the RA a permission to read the data in the secondary memory, and then the RA can read the data in the secondary memory.

For an RA that is in the plurality of RAs and that is used to write data (such as a write processing instruction, to-be-processed data, and a processing result) into an address in the secondary memory, after receiving a request sent by the RA for writing data into the address, the HA needs to perform consistency check to ensure that the RA has an exclusive right to the address. For example, the HA may check whether another RA currently caches a copy of the data at this address. In this case, if currently another RA caches the copy of the data at the address, and if an RA writes data into the address, the copy cached by the another RA is inconsistent with actual data at the address. Therefore, in this case, the HA invalidates these copies in a consistency check process, and then grants the RA used to write data into the address the permission to write data to the address. Then the RA can write data into the address. In this way, it can be ensured that the data that is at the address and that is read by each RA is consistent. It should be noted that, when the copy cached by the RA is invalid, if the RA needs to read the data again, the RA re-initiates, to the HA, a request for reading the data in the secondary memory because the copy is invalid.

Further, if the foregoing data processing method involves reading/writing a state value of an I/O register in the accelerator, the read/write process may also be implemented by using the foregoing cache coherence module to ensure cache coherence of the state value of the I/O register in the accelerator. For a process of reading/writing the state value of the I/O register by using the cache coherence module, refer to the process of performing read/write on the secondary memory by using the cache coherence module. Details are not described herein in this embodiment of this application.

The foregoing describes in detail the data processing method provided in this application with reference to FIG. 1 to FIG. 6. It can be learned from the data processing method that the heterogeneous system provided in embodiments of this application includes the first processor, the first accelerator, which are connected, and the first secondary memory connected to the first accelerator.

The first processor is configured to write to-be-processed data into the first secondary memory. The first processor is further configured to trigger the first accelerator to process the to-be-processed data in the first secondary memory according to the processing instruction. The first accelerator is configured to write a processing result of the to-be-processed data into the first secondary memory. The first accelerator is configured to trigger the first processor to read the processing result from the first secondary memory.

Optionally, the first processor is connected to the first accelerator by using a cache coherence bus.

Optionally, the cache coherence bus includes a CCIX bus or a CXL bus.

Optionally, the cache coherence bus includes a CCIX bus, and the first processor includes an ARM architecture processor; or the cache coherence bus includes a CXL bus, and the first processor includes an x86 architecture processor.

Optionally, the secondary memory includes an HBM.

Optionally, the accelerator includes a GPU, an FPGA, or an ASIC.

Optionally, the heterogeneous system includes a plurality of accelerators connected to each other, where the first accelerator is any one of the plurality of accelerators. The processing instruction carries an accelerator identifier, where the accelerator identifier is an identifier of an accelerator that is in the plurality of accelerators and that is used to execute the processing instruction. The first accelerator is configured to process the to-be-processed data in the first secondary memory according to the processing instruction when the accelerator identifier is an identifier of the first accelerator.

Optionally, the heterogeneous system includes a plurality of secondary memories connected to the plurality of accelerators respectively, and a plurality of processors connected to each other. The first processor is any processor that is in the plurality of processors and that is connected to the first accelerator. The processing instruction further carries the identifier of the first processor. The first accelerator is configured to: when the accelerator identifier is not the identifier of the first accelerator, write the to-be-processed data into a secondary memory connected to a secondary accelerator indicated by the accelerator identifier, and trigger the secondary accelerator to process the to-be-processed data according to the processing instruction. The secondary accelerator is configured to: after the to-be-processed data is processed according to the processing instruction, write the processing result of the to-be-processed data into the connected secondary memory; and trigger, based on the identifier of the first processor carried in the processing instruction, the first processor to read the processing result from the secondary memory connected to the secondary accelerator.

Optionally, the plurality of accelerators are connected by using a cache coherence bus, and the plurality of processors are connected by using a cache coherence bus.

It can be learned that in the data processing method provided in this embodiment, the first accelerator can assist the first processor in processing the to-be-processed data. Therefore, a data processing capability of the entire heterogeneous system is strong.

In addition, in the data processing method, the first processor can directly write the to-be-processed data into the secondary memory connected to the first accelerator. Therefore, a process in which the first processor notifies the first accelerator to migrate the to-be-processed data from a primary memory connected to the first processor to the secondary memory is avoided, and a process in which the first accelerator migrates the to-be-processed data is also avoided.

In addition, in the data processing method, the first accelerator can directly write the processing result into the secondary memory, and the first processor can obtain the processing result from the secondary memory. Therefore, a process in which the first accelerator notifies the first processor that the to-be-processed data is processed and the first processor notifies the first accelerator to migrate the processing result from the secondary memory to the primary memory is avoided.

Therefore, in this embodiment, a quantity of times of interaction between the first processor and the first accelerator is small, and a procedure of the data processing method is simple. As a result, data processing efficiency is high.

Figure 7:
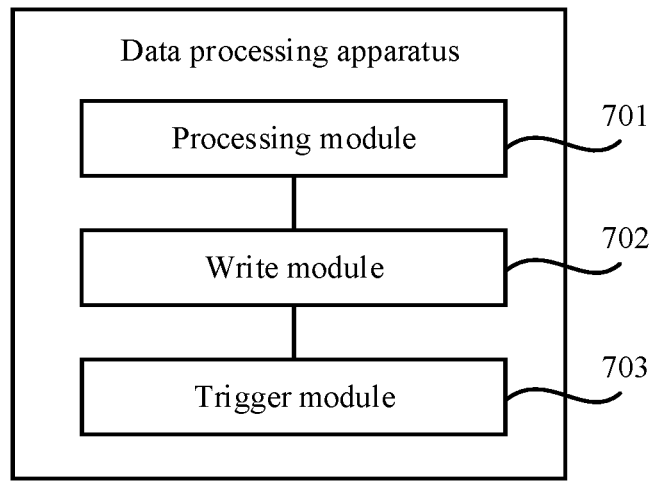
FIG. 7 is a block diagram of a data processing apparatus according to an embodiment.
Figure 8:
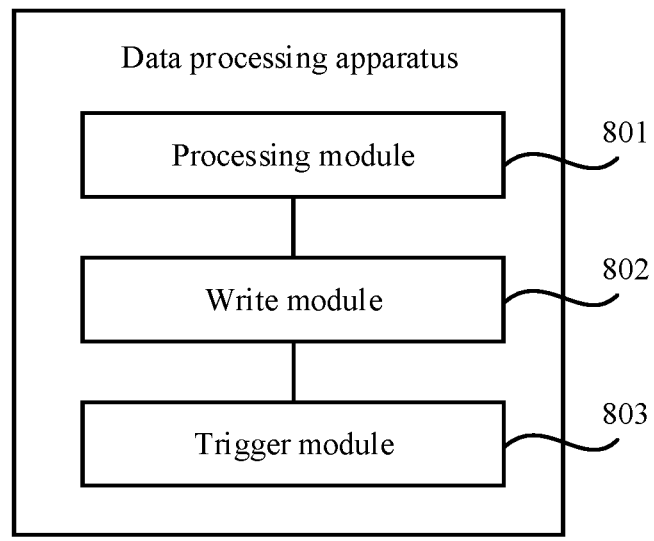
FIG. 8 is a block diagram of another data processing apparatus according to an embodiment.
Figure 9:
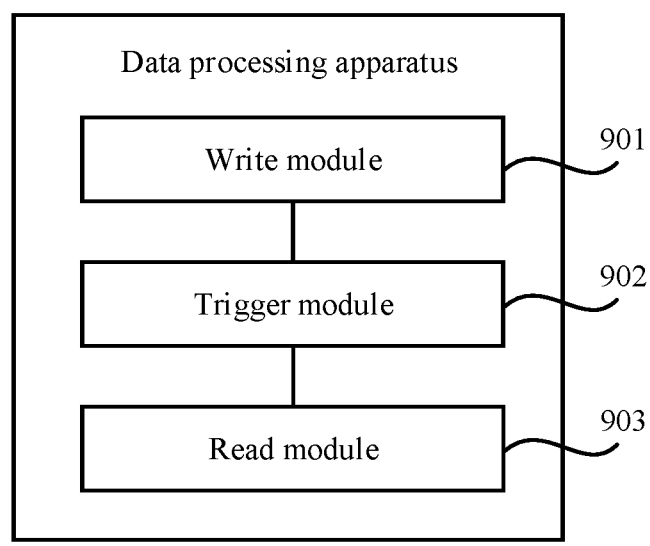
FIG. 9 is a block diagram of still another data processing apparatus according to an embodiment.

Further, the following describes data processing apparatuses in the data processing system provided with reference to FIG. 7 to FIG. 9.

For example, FIG. 7 is a block diagram of a data processing apparatus according to an embodiment. The data processing apparatus may be the first accelerator in the data processing system provided in embodiments of this application. As shown in FIG. 7, the data processing apparatus includes the following modules.

A processing module 701 is configured to process to-be-processed data in a first secondary memory according to a processing instruction due to triggering performed by a first processor. For operations performed by the processing module 701, refer to S403 or S504 (or the description related to S403 or S504). Details are not described herein in this embodiment of this application.

A write module 702 is configured to write a processing result of the to-be-processed data into the first secondary memory. For operations performed by the write module 702, refer to S404 or S505 (or the description related to S404 or S505). Details are not described herein in this embodiment of this disclosure.

A trigger module 703 is configured to trigger the first processor to read the processing result from the first secondary memory. For operations performed by the trigger module 703, refer to S405 or S506 (or the description related to S405 or S506). Details are not described herein in this embodiment of this disclosure.

Optionally, the foregoing data processing apparatus is further configured to perform another operation in the data processing method shown in FIG. 5A and FIG. 5B. For example, the processing module 701 is further configured to perform S503 in FIG. 5A, the write module 702 is further configured to perform S508 in FIG. 5B, and the trigger module 703 is further configured to perform S509 in FIG. 5B. For a specific process of performing each step by each module in the data processing apparatus, refer to the foregoing descriptions of FIG. 4 and descriptions of FIG. 5A and FIG. 5B. Details are not described herein again.

For another example, FIG. 8 is a block diagram of another data processing apparatus according to an embodiment. The data processing apparatus may be the secondary accelerator in the data processing system provided in embodiments of this disclosure. A heterogeneous system includes a plurality of processors connected to each other, a plurality of accelerators connected to each other, and a plurality of secondary memories connected to the plurality of accelerators respectively; and the secondary accelerator and a first accelerator are any two connected accelerators in the plurality of accelerators. As shown in FIG. 8, the processing apparatus includes the following modules.

A processing module 801 is configured to process, according to a processing instruction due to triggering performed by the first accelerator, to-be-processed data in a secondary memory connected to the secondary accelerator, where the processing instruction carries an identifier of a first processor connected to the first accelerator. For operations performed by the processing module 801, refer to S510 (or the description related to S510). Details are not described herein in this embodiment.

A write module 802 is configured to write a processing result of the to-be-processed data into the connected secondary memory. For operations performed by the write module 802, refer to S511 (or the description related to S511). Details are not described herein in this embodiment.

A trigger module 803 is configured to trigger, based on the identifier of the first processor carried in the processing instruction, the first processor to read the processing result from the secondary memory connected to the secondary accelerator. For operations performed by the trigger module 803, refer to S512 (or the description related to S512). Details are not described herein in this embodiment.

For another example, FIG. 9 is a block diagram of still another data processing apparatus according to an embodiment of this application. The data processing apparatus may be the first processor in the data processing system provided in embodiments of this application. The heterogeneous system further includes: the first accelerator connected to the first processor, and the first secondary memory connected to the first accelerator. As shown in FIG. 9, the processing apparatus includes the following modules.

A write module 901 is configured to write to-be-processed data into the first secondary memory. For operations performed by the write module 901, refer to S401 or S501 (or the description related to S401 or S501). Details are not described herein in this embodiment.

A trigger module 902 is configured to trigger the first accelerator to process the to-be-processed data in the first secondary memory according to a processing instruction. For operations performed by the trigger module 902, refer to S402 or S502 (or the description related to S402 or S502). Details are not described herein in this embodiment.

A read module 903 is configured to read a processing result of the to-be-processed data from the first secondary memory due to triggering performed by the first accelerator. For operations performed by the read module 903, refer to S406 or S507 (or the description related to S406 or S507). Details are not described herein in this embodiment.

Optionally, the foregoing data processing apparatus is further configured to perform another operation in the data processing method shown in FIG. 5A and FIG. 5B. For example, the read module 903 is further configured to perform S513 in FIG. 5B. For a specific process of performing each step by each module in the data processing apparatus, refer to the foregoing descriptions of FIG. 4 and descriptions of FIG. 5A and FIG. 5B. Details are not described herein.

An embodiment of this application provides a computer storage medium. The storage medium stores a computer program, and the computer program is configured to perform any data processing method provided in this disclosure.

An embodiment provides a computer program product including instructions. When the computer program product runs on a computer apparatus, the computer apparatus is enabled to perform any data processing method provided in embodiments of this disclosure.

All or some of the foregoing embodiments may be implemented by using software, hardware, firmware, or any combination thereof. When the software is used to implement embodiments, all or some of the embodiments may be implemented in a form of a computer program product. The computer program product includes one or more computer instructions. When the computer program instructions are loaded and executed on a computer, the procedures or functions according to embodiments of this disclosure are all or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk drive, or a magnetic tape), an optical medium, a semiconductor medium (for example, a solid-state drive), or the like.

In this disclosure, the terms "first", "second", and the like are merely intended for description, but cannot be understood as an indication or implication of relative importance. The term "at least one" refers to one or more, and the term "a plurality of" refers to two or more, unless otherwise specified.

Mutual reference may be made to different types of embodiments such as the method embodiments and the apparatus embodiments provided in this application. This is not limited in embodiments of this disclosure. A sequence of the operations of the method embodiments provided in this application can be properly adjusted, and operations can be correspondingly added or deleted based on a situation. Any modified method that can be easily figured out by a person skilled in the art without departing from a technical scope disclosed in this application shall fall within the protection scope of this application, and therefore details are not described again.

In the corresponding embodiments provided in this disclosure, it should be understood that the disclosed apparatus and the like may be implemented in other composition manners. For example, the described apparatus embodiment is merely an example. For example, division into the modules is merely logical function division and may be other division in actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The modules described as separate parts may or may not be physically separate, and parts described as modules may or may not be physical units, may be located in one position, or may be distributed on a plurality of devices. Some or all of the modules may be selected based on an actual requirement to achieve the objectives of the solutions of the embodiments.

The foregoing descriptions are merely specific embodiments of this disclosure, but are not intended to limit the scope of protection scope as defined in the claims accompanying this disclosure.

What is claimed is:

1. A heterogeneous system, comprising:
a processor, a plurality of accelerators, and a plurality of secondary memories each connected to a corresponding one of the plurality of accelerators;
wherein the processor is configured to:
write to-be-processed data into a first secondary memory of the plurality of processors;
trigger a first accelerator of the plurality of accelerators to process the to-be-processed data in the first secondary memory according to a processing instruction, wherein the processing instruction carries an identifier of the processor and an accelerator identifier identifying one of the plurality of accelerators that is configured to execute the processing instruction;
wherein the first accelerator is configured to:
when the accelerator identifier is not an identifier of the first accelerator, write the to-be-processed data into a second secondary memory connected to a second accelerator indicated by the accelerator identifier; and
trigger the second accelerator to process the to-be-processed data according to the processing instruction; and
wherein the second accelerator is configured to:
process the to-be-processed data in the second secondary memory;
write a processing result of the to-be-processed data into the second secondary memory connected to the secondary accelerator; and
trigger, based on the identifier of the processor carried in the processing instruction, the processor to read the processing result from the second secondary memory connected to the secondary accelerator.

2. The heterogeneous system according to claim 1, wherein the processor is connected to the accelerator by a cache coherence bus.

3. The heterogeneous system according to claim 2, wherein the cache coherence bus comprises a cache coherent interconnect for accelerators (CCIX) bus, and the processor comprises an advanced reduced instruction set computing machine architecture processor; or
the cache coherence bus comprises a compute express link (CXL) bus, and the processor comprises an x86 architecture processor.

4. The heterogeneous system according to claim 1, wherein
the first accelerator is configured to process the to-be-processed data in the first secondary memory according to the processing instruction when the accelerator identifier is an identifier of the first accelerator.

5. The heterogeneous system according to claim 1, wherein that the second accelerator is configured to trigger, based on the identifier of the processor carried in the processing instruction, the processor to read the processing result comprises:
the second accelerator is configured to send a processing response for the to-be-processed data to the processor based on the identifier of the processor carried in the processing instruction, the processing response carrying a storage address of the processing result in the second secondary memory.

6. A data processing method performed by a heterogeneous system comprising a processor, a plurality of accelerators, and a plurality of secondary memories each connected to a corresponding one of the plurality of accelerators, the method comprising:
  obtaining, by a first accelerator of the plurality of accelerators, a processing instruction that carries an identifier of the processor and an accelerator identifier identifying one of the plurality of accelerators that is configured to execute the processing instruction;
  when the accelerator identifier is not an identifier of the first accelerator, writing, by the first accelerator according to the processing instruction, to-be-processed data stored in a first secondary memory of the plurality of secondary memories into a second secondary memory connected to a second accelerator indicated by the accelerator identifier;
  triggering, by the first accelerator, the second accelerator to process the to-be-processed data according to the processing instruction;
  processing, by the second accelerator, the to-be-processed data in the second secondary memory;
  writing, by the second accelerator, a processing result of the to-be-processed data into the second secondary memory; and
  triggering, by the second accelerator, the processor to read the processing result from the second secondary memory.

7. The method according to claim 6, wherein the method further comprises:
  processing, by the first accelerator, the to-be-processed data in the first secondary memory according to the processing instruction when the accelerator identifier is an identifier of the first accelerator; and
  writing, by the first accelerator, a processing result of the to-be-processed data into the first secondary memory.

8. The method according to claim 6, the triggering, by the second accelerator, the processor to read the processing result comprising:
  sending, by the second accelerator, a processing response for the to-be-processed data to the processor based on the identifier of the processor carried in the processing instruction, the processing response carrying a storage address of the processing result in the second secondary memory.

9. A non-transitory computer storage medium storing a computer program executable by a heterogeneous system comprising a processor, a plurality of accelerators, and a plurality of secondary memories each connected to a corresponding one of the plurality of accelerators; wherein the computer program comprises:
  instructions for causing a first accelerator of the plurality of accelerators to:
    obtain a processing instruction that carries an identifier of the processor and an accelerator identifier identifying one of the plurality of accelerators that is configured to execute the processing instruction;
    when the accelerator identifier is not an identifier of the first accelerator, write, according to the processing instruction, to-be-processed data stored in a first secondary memory of the plurality of secondary memories into a second secondary memory connected to a second accelerator indicated by the accelerator identifier; and
    trigger the second accelerator to process the to-be-processed data according to the processing instruction; and
  instructions for causing the second accelerator to:
    process the to-be-processed data in the second secondary memory;
    write a processing result of the to-be-processed data into the second secondary memory; and
    trigger the processor to read the processing result from the second secondary memory.

10. The non-transitory computer storage medium according to claim 9, wherein the computer program further comprises instructions for causing the first accelerator to:
  process the to-be-processed data in the first secondary memory according to the processing instruction when the accelerator identifier is an identifier of the first accelerator; and
  write a processing result of the to-be-processed data into the first secondary memory.

11. The non-transitory computer storage medium according to claim 9, the trigger the processor to read the processing result from the second secondary memory comprising:
  send a processing response for the to-be-processed data to the processor based on the identifier of the processor carried in the processing instruction, the processing response carrying a storage address of the processing result in the second secondary memory.

* * * * *